Dec. 14, 1937.   A. W. KOGSTROM   2,102,420
VEHICLE SUSPENSION SYSTEM
Filed Feb. 13, 1936   2 Sheets-Sheet 2

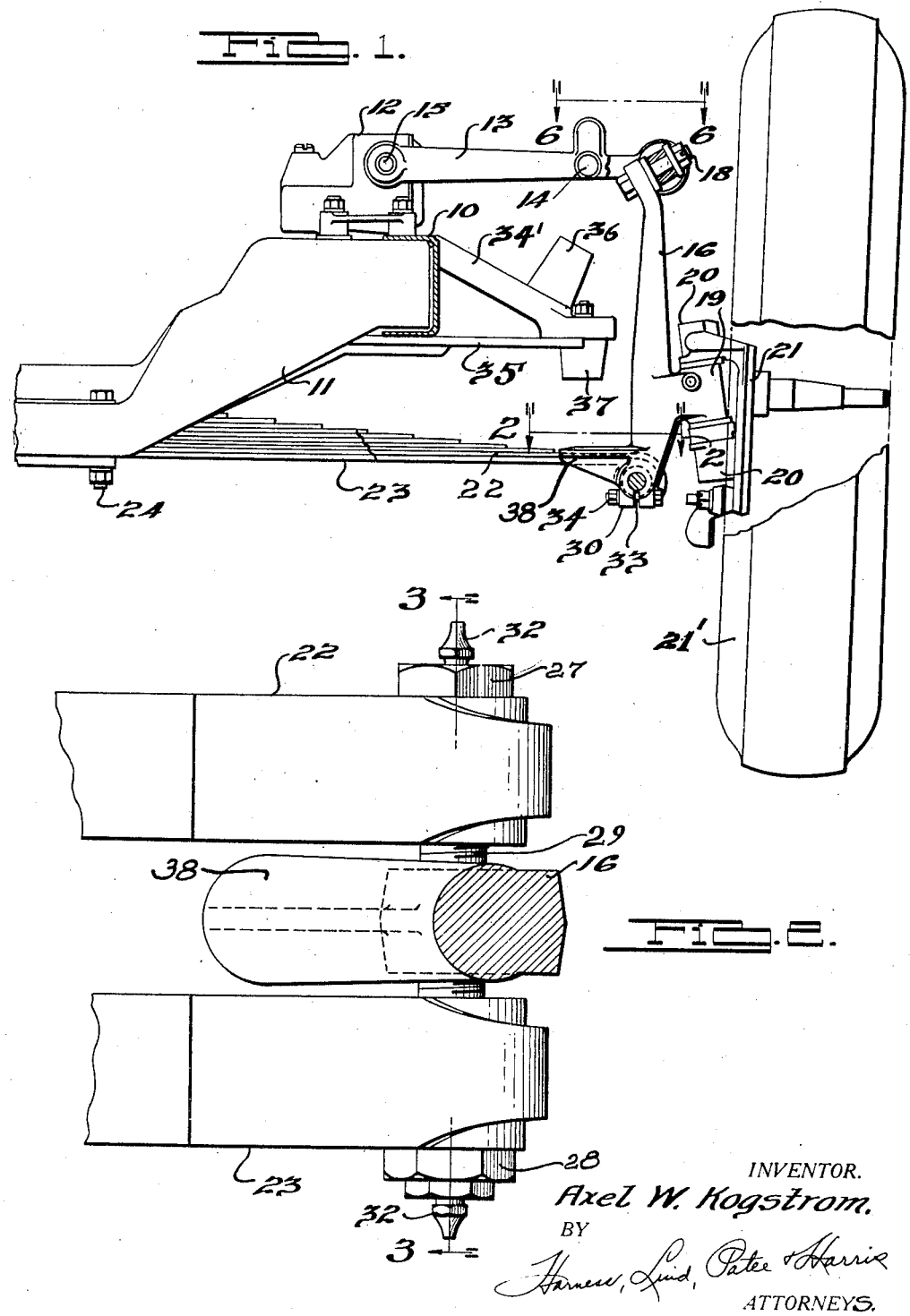

INVENTOR.
Axel W. Kogstrom.
BY
ATTORNEYS.

Patented Dec. 14, 1937

2,102,420

UNITED STATES PATENT OFFICE 2,102,420

VEHICLE SUSPENSION SYSTEM

Axel W. Kogstrom, Highland Park, Mich., assignor to Chrysler Corporation, Highland Park, Mich., a corporation of Delaware Application February 13, 1936, Serial No. 63,717

8 Claims. (Cl. 267—19)

This invention relates to vehicle suspension systems.

The invention is illustrated and described in connection with a vehicle suspension system of the type wherein a plurality of leaf spring assemblies form a part of the vehicle wheel mounting unit and permit movement of one wheel independently of the other vehicle wheels. While the invention has particular significance in connection with the system illustrated, yet in its broader aspects it is not to be confined to the embodiment herein disclosed.

An object of the invention is the provision of improved means for connecting together the adjacent ends of the spring assemblies to eliminate unnecessary binding of the parts and to insure complete flexure of the assemblies in response to vertical movement of a road wheel or wheels.

In vehicle suspension systems of the above type considerable difficulty has been experienced in eliminating binding in the connection between the spring assemblies due generally to variations in length of the latter. Difficulty has also been encountered in assembling the spring connection due to misalignment of the spring eyes.

A further object of the invention is to overcome these difficulties by the provision of improved means for connecting the spring assemblies together in such a manner as to compensate for any misalignment of the spring eyes resulting from inaccuracies in manufacture, adjustment or replacement.

Other objects and advantages of the invention will be more apparent from the following description taken in connection with the accompanying drawings, in which:

Fig. 1 is a fragmentary front elevational view, partly in section, of a vehicle suspension system embodying the invention.

Fig. 2 is a fragmentary top plan view taken in the direction of the line 2—2 of Fig. 1.

Figure 3:
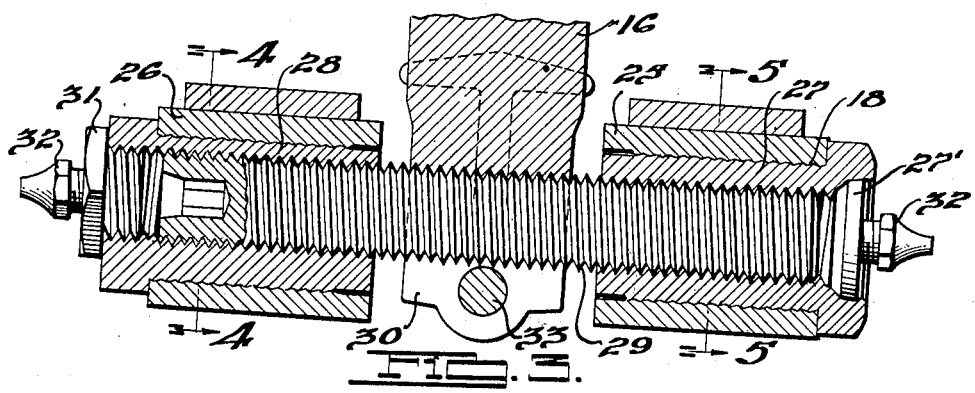
Fig. 3 is a vertical sectional view taken on the line 3—3 of Fig. 2.
Figure 4:
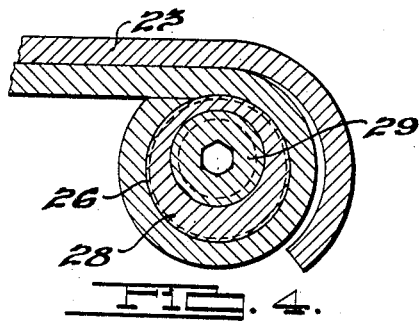
Fig. 4 is a vertical sectional view taken on the line 4—4 of Fig. 3.
Figure 5:
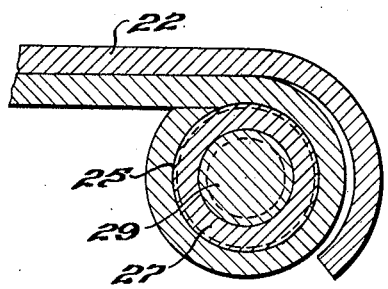
Fig. 5 is a vertical sectional view taken on the line 5—5 of Fig. 3.
Figure 6:
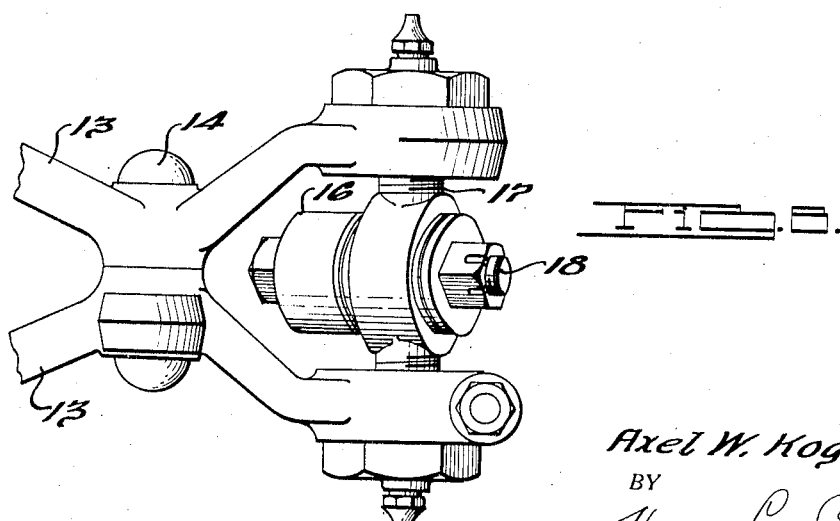
Fig. 6 is a fragmentary top plan view taken in the direction of the line 6—6 of Fig. 1.

The invention is illustrated and described in connection with a fragmentary portion of a vehicle chassis which may be either the forwardly or rearwardly disposed portion thereof, it being understood that the invention and its application to the remaining portions are in general identical to that shown and described.

The vehicle chassis includes a frame structure having spaced side rails 10, preferably channel shaped, the rails being connected together by a frame cross member 11 having a substantially flat intermediate portion and upwardly and outwardly extending end portions. A suitable shock absorber mechanism 12 is carried by the frame structure and has a pair of outwardly extending irregularly shaped links 13 which are secured together intermediate their ends by a rivet 14. The inner ends of the links 13 are attached to an oscillating arm 15 of the shock absorbing mechanism. A substantially vertically disposed arm 16 is pivotally connected at its upper end to the outer ends of the links 13 by means of a pin 17 having its end portions disposed in an aperture of a respective link 13. A bolt 18 secures the arm 16 to the pin 17. The arm 16 has an outwardly extending vertically apertured boss 19 which is disposed between vertically spaced apertured bosses 20 of a wheel spindle member 21 on which is rotatably mounted a road wheel 21'. A suitable king pin, not shown, is received in the aligned apertures of the bosses 19 and 20.

A pair of transversely extending longitudinally spaced multi-leaf springs 22 and 23 are secured to the cross member 11 by bolts 24. These springs support the weight of the vehicle frame structure and the wheel supporting arm 16 and are operatively connected together and to the latter as will hereafter appear. The lowermost leaf of each spring is curled at the end to provide cylindrically shaped eye portions 25 and 26, respectively, and the extremity of the next to the lower-most leaf projects over the associated eye and is curled semi-cylindrically thereabout but spaced therefrom sufficiently to accommodate relative movement of the leaves during flexure of the springs. A bushing 27 is disposed in the eye 25 and has an axis concentric with respect to the axis of its eye. Another bushing 28 is disposed in the eye 26, the latter bushing being of the eccentric type and having an axis non-concentric with respect to the axis of its associated eye. The bushings 25 and 26 have relatively shallow threaded exterior surfaces for engagement with similarly threaded interior surfaces of the respective spring eyes. A shackle pin or shaft 29 is in threaded engagement with the inner surfaces of the bushings 25 and 26 and forms a connection between the springs 22 and 23. The intermediate portion of the pin 29 is in threaded engagement with a split boss 30 formed on the lower extremity of the arm 16. Each of the bushings 25 and 26 has an enlarged head portion engaging the outer end face of its associated spring eye. The head portion of the bushing 27 is closed axially by a suitable plug 27'. A nut member 31 having an enlarged head portion is threaded into the enlarged portion of the bushing 28. Suitable lubricant nipples 32 are provided at the opposite ends of the pin 29. The sections of the boss 30 are drawn inwardly with respect to each other by a transversely extending bolt 33 having nut members 34 threaded on the opposite ends thereof and in engagement with the respective adjacent faces of the boss 30.

Carried by the frame structure is a pair of outwardly extending arms 34' and 35 on which are secured cushioning members 36 and 37, respectively, preferably formed of rubber. These members serve to cushion and check abnormal vertical movement, the member 37 registering with a lateral projection 38 integral with the arm 16, and the member 36 registering with the arm 13.

In the assembly of the springs 22 and 23, the bushings 27 and 28, pin 29 and arm 16, the bushings are first located in their respective spring eyes, the concentric bushing 17 being initially moved to its finally assembled position. The eccentric bushing 28 is then located in the eye 26 and the pin 29 threaded therethrough and also through the boss 30 on the arm 16 and then into the concentric bushing 27. Due to the fact that it is practically an impossibility to provide springs having exact lengths in order that the axes of the eyes thereof are aligned, difficulty is frequently encountered in threading the pin 29 into the bushing 27. When this difficulty is experienced the eccentric bushing 28 is rotated in a counter-clockwise direction until the axes of the pin 29 and bushing 27 are aligned so that the former can be threaded into the latter. When the bushing 27 has been rotated to a position that the pin 29 will freely engage the threaded portion of the bushing 27 the bolt 31 is tightened sufficiently to cause the split sections of the boss 30 to engage the pin 29 to prevent the latter from freely rotating. The nut member 31 is then threaded into position. The tension exerted by the spring eye on the bushing 28 will prevent the latter from rotating from its predetermined position of adjustment. In practice it has been found desirable to make the above assembly with the springs 22 and 23 under load.

It will be understood that the position of the bushings 25 and 26 may be reversed with respect to the springs 22 and 23 without departing from the spirit of the invention, and furthermore that the opposite adjacent end portions of these springs are formed and assembled in the manner herein disclosed.

Various modifications and changes will readily be apparent from the teachings of my invention and many changes may be made within the scope and spirit of the invention as defined in the appended claims, my invention in its broader aspects not being limited to the foregoing described illustrative embodiment.

What I claim is:

1. In a vehicle suspension system, a plurality of weight supporting springs, each of said springs having an eye portion, a bushing disposed in each of said eye portions, a shaft extending through said bushings for connecting the adjacent ends of said springs together, at least one of said bushings provided for an adjustment of said shaft relative to the axis of one of said spring eye portions.

2. In a vehicle suspension system, a plurality of weight supporting springs, said springs having respective eye portions disposed in approximate alignment with each other, a shaft extending through said eye portions for connecting the adjacent ends of said springs, and means including an eccentric bushing for adjusting the position of said shaft in one of said eye portions to compensate for misalignment of said eye portions.

3. In a vehicle suspension system, a plurality of weight supporting springs, said springs having respective eye portions disposed in approximate alignment with each other, said eye portions having internally threaded surfaces, a shaft extending into said eye portions for connecting adjacent ends of said springs, and means including an eccentric bushing for adjusting the position of said shaft in one of said eye portions to compensate for misalignment of said eye portions, said bushing being in threaded engagement with said shaft and one of said eye portions.

4. In a vehicle suspension system comprising in combination, a vehicle frame structure, a pair of transversely extending springs secured to said frame structure, a wheel supporting member, a shaft operatively connecting the adjacent ends of said springs to said member, a bushing carried by each of said springs and engaging said pin, one of said bushings having an axis concentric with respect to the axis of said pin and the other of said bushings having an axis eccentric with respect to the axis of said pin.

5. In a vehicle suspension system, a frame structure, a plurality of springs fixed at a point with respect to said frame structure, said springs having eye portions in a pair of adjacent ends respectively, said eye portions being disposed in approximate alignment with each other, bushings disposed in said eye portions respectively, a shaft operatively connecting said springs and having a respective end portion disposed in said bushings, one of said bushings providing for adjustment of the position of said shaft in one of said eye portions and relative to each of said springs to compensate for misalignment of said eye portions.

6. In a vehicle suspension system, a plurality of separate weight supporting leaf spring assemblies having respective eye portions in their adjacent ends, means for connecting the adjacent ends of said spring assemblies comprising a shaft having axially aligned end portions extending into a respective eye portion, and means including an eccentric bushing for adjusting the position of said shaft in one of said eye portions to compensate for misalignment of said eye portions.

7. In a vehicle suspension system, a plurality of separate weight supporting leaf spring assemblies having respective eye portions in their adjacent ends, means for connecting the adjacent ends of said spring assemblies comprising a shaft having axially aligned end portions extending into a respective eye portion, and means for journaling said shaft in said eye portions, at least one of said journal means including manually operable means providing for an adjustment of said shaft relative to the axis of one of said spring assembly eye portions to compensate for misalignment of said eye portions.

8. In a vehicle suspension system comprising in combination, a vehicle frame structure, a pair of transversely extending springs secured to said frame structure, said springs having respective eye portions in their adjacent ends, a wheel support member having a threaded bore, means for operatively connecting said springs and said member comprising a shaft having axially aligned end portions extending into a respective eye portion and an intermediate portion extending through said bore in threaded engagement with said member, and means for journaling said shaft in said eye portions comprising bushings threadedly engaging one of said eye portions and one of said end portions of said shaft respectively.

AXEL W. KOGSTROM.